(12) United States Patent
Kim et al.

(10) Patent No.: US 8,790,822 B2
(45) Date of Patent: Jul. 29, 2014

(54) RECHARGEABLE BATTERY

(75) Inventors: Sung-Bae Kim, Yongin-si (KR); Sang-Won Byun, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 354 days.

(21) Appl. No.: 13/137,725

(22) Filed: Sep. 8, 2011

(65) Prior Publication Data

US 2012/0064394 A1    Mar. 15, 2012

(30) Foreign Application Priority Data

Sep. 10, 2010   (KR) .......................... 10-2010-0088975

(51) Int. Cl.
*H01M 2/04* (2006.01)
*H01M 2/08* (2006.01)
*H01M 2/30* (2006.01)

(52) U.S. Cl.
USPC .......................................... 429/181; 429/175

(58) Field of Classification Search
None
See application file for complete search history.

(56) References Cited

U.S. PATENT DOCUMENTS

| 7,536,229 | B2 | 5/2009 | Ichikawa et al. |
| 2009/0186269 | A1 | 7/2009 | Kim et al. |
| 2011/0200870 | A1 | 8/2011 | Kim et al. |

FOREIGN PATENT DOCUMENTS

| JP | 2003-115286 | * | 4/2003 |
| JP | 2006-019224 A | | 1/2006 |
| JP | 2008-305753 A | | 12/2008 |
| KR | 10-2009-0081197 | | 7/2009 |
| KR | 10-2011-0093372 | | 8/2011 |

* cited by examiner

*Primary Examiner* — Jonathan Crepeau
(74) *Attorney, Agent, or Firm* — Lee & Morse, P.C.

(57) ABSTRACT

A rechargeable battery includes an electrode assembly; a case having an opening and in which the electrode assembly is installed; a cap plate combined to the opening and sealing the case; at least one electrode terminal electrically connected with the electrode assembly; a lower gasket disposed between the cap plate and the electrode terminal, and having an end portion disposed at a lower portion of the cap plate and including a first inclined side forming an acute angle or obtuse angle with respect to a side of the cap plate; and a lower insulating member provided in the case, and having an end portion disposed adjacent to the end portion of the lower gasket in a lower portion of the cap plate and including a second inclined side forming an acute angle or an obtuse angle with respect to the side of the cap plate.

10 Claims, 8 Drawing Sheets

RECHARGEABLE BATTERY

BACKGROUND

1. Field

The described technology relates generally to a rechargeable battery. More particularly, the described technology relates generally to a rechargeable battery of which a lower gasket and a lower insulating member are improved in structure.

2. Description of the Related Art

A rechargeable battery differs from a primary battery in that a rechargeable battery can be repeatedly charged and discharged, while a primary battery undergoes an irreversible conversion of chemical to electrical energy. The low-capacity rechargeable battery is used as the power supply for small electronic devices, such as cellular phones, notebook computers and camcorders, while the high-capacity rechargeable battery is used as the power supply for driving motors in hybrid vehicles and the like.

A high-power rechargeable battery using a non-aqueous electrolyte with a high energy density may include a plurality of rechargeable cells coupled to each other in series such that the high-power rechargeable battery can be used as the power supply for driving motors in electric vehicles requiring high power. The rechargeable battery may have a cylindrical shape or a prismatic shape.

The above information disclosed in this Description of Related Art is only for enhancement of understanding of the background of the described technology and therefore, this section may contain information that does not form the prior art that is already known in this country to a person of ordinary skill in the art.

SUMMARY

According to an exemplary embodiment, there is provided a rechargeable battery that includes: an electrode assembly, a case having an opening and in which the electrode assembly is installed, a cap plate combined to the opening and sealing the case; at least one electrode terminal electrically connected with the electrode assembly, a lower gasket between the cap plate and the electrode terminal, the lower gasket having an end portion at a lower portion of the cap plate and including a first inclined side forming an acute angle or an obtuse angle with respect to a side of the cap plate, and a lower insulating member provided in the case, the lower insulating member having an end portion adjacent to the end portion of the lower gasket in a lower portion of the cap plate and including a second inclined side forming an acute angle or an obtuse angle with respect to the side of the cap plate.

The first inclined side of the lower gasket and the second inclined side of the lower insulating member may have different inclined angles.

The inclined angle of the first inclined side may be smaller than the inclined angle of the second inclined side.

The inclined angle of the first inclined side may be greater than the inclined angle of the second inclined side.

The inclined angle of the first inclined side and the inclined angle of the second inclined side may be supplementary angles.

The first inclined side of the lower gasket and the second inclined side of the lower insulating member may at least partially contact each other.

The first inclined side and the second inclined side may fully contact each other.

The end portion of the lower gasket may include a deformable material and the first inclined side may press against the second inclined side to seal a space between the first inclined side and the second inclined side.

According to another exemplary embodiment a rechargeable battery includes: an electrode assembly; a case having an opening and in which the electrode assembly is installed, a cap plate combined to the opening and sealing the case, at least one electrode terminal electrically connected with the electrode assembly; a lower gasket between the cap plate and the electrode terminal and having an end portion at a lower portion of the cap plate; and a lower insulating member provided in the case and having an end portion adjacent to the end portion of the lower gasket in a lower portion of the cap plate. The cap plate includes a stepped groove at a lower portion thereof and at least one of the end portion of the lower gasket and the end portion of the lower insulating member extends into the stepped groove.

The lower gasket may include a first protruding portion protruding from the end portion of the lower gasket, and the first protruding portion extends into the stepped groove.

The lower insulating member may include a second protruding portion protruding from the end portion of the lower insulating member, and the second protruding portion extends into the stepped groove.

The lower gasket may include a first protruding portion protruding from the end portion of the lower gasket, the lower insulating member may include a second protruding portion protruding from the end portion of the lower insulating member, and the first and second protruding portions may extend into the stepped groove.

The end portion of the lower gasket may include a first inclined side, the end portion of the lower insulating member may include a second inclined side, and the first inclined side of the lower gasket and the second inclined side of the lower insulating member may contact each other.

The end portion of the lower gasket may include a deformable material such that the first inclined side presses against the second inclined side to seal a space between the first inclined side and the second inclined side.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
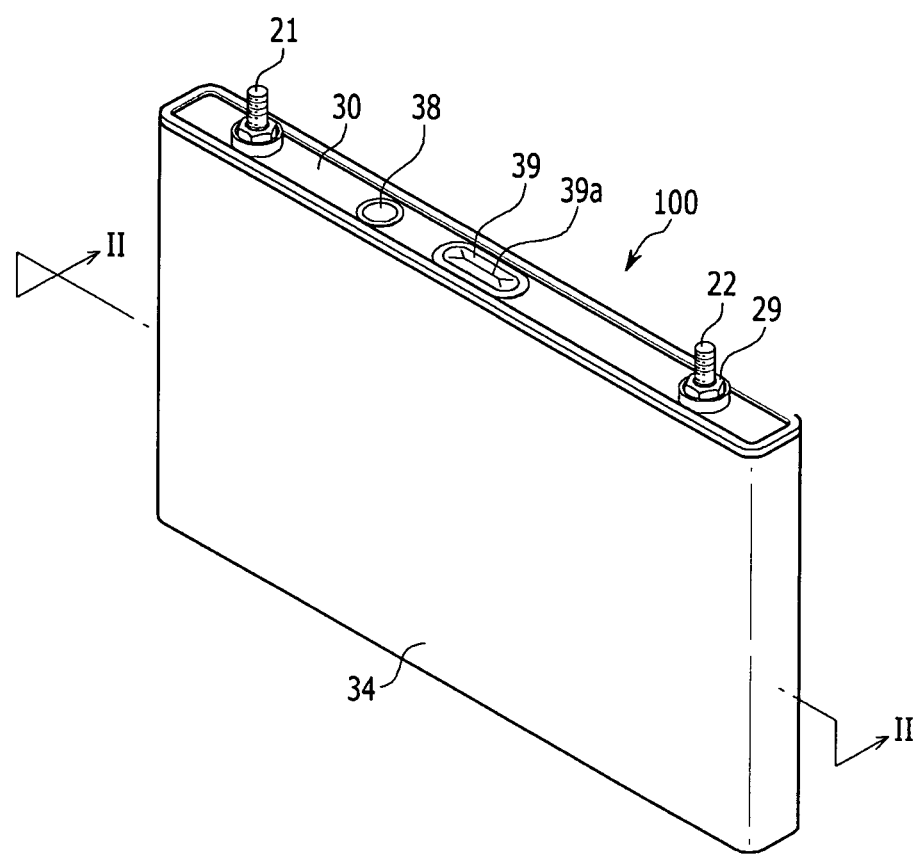
FIG. 1 illustrates a perspective view of a rechargeable battery according to an exemplary embodiment.

Korean Patent Application No. 10-2010-0088975, filed on Sep. 10, 2010, in the Korean Intellectual Property Office, and entitled: "Rechargeable Battery," is incorporated by reference herein in its entirety Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope to those skilled in the art.

In the drawing figures, the dimensions of layers and regions may be exaggerated for clarity of illustration. Herein, for convenience of description, the term "upper" may refer to a direction towards an exterior of the battery perpendicular to the cap plate as further described, and the term "lower" may refer to a direction toward an interior of the battery perpendicular to the cap plate. Like reference numerals refer to like elements throughout.

Figure 2:
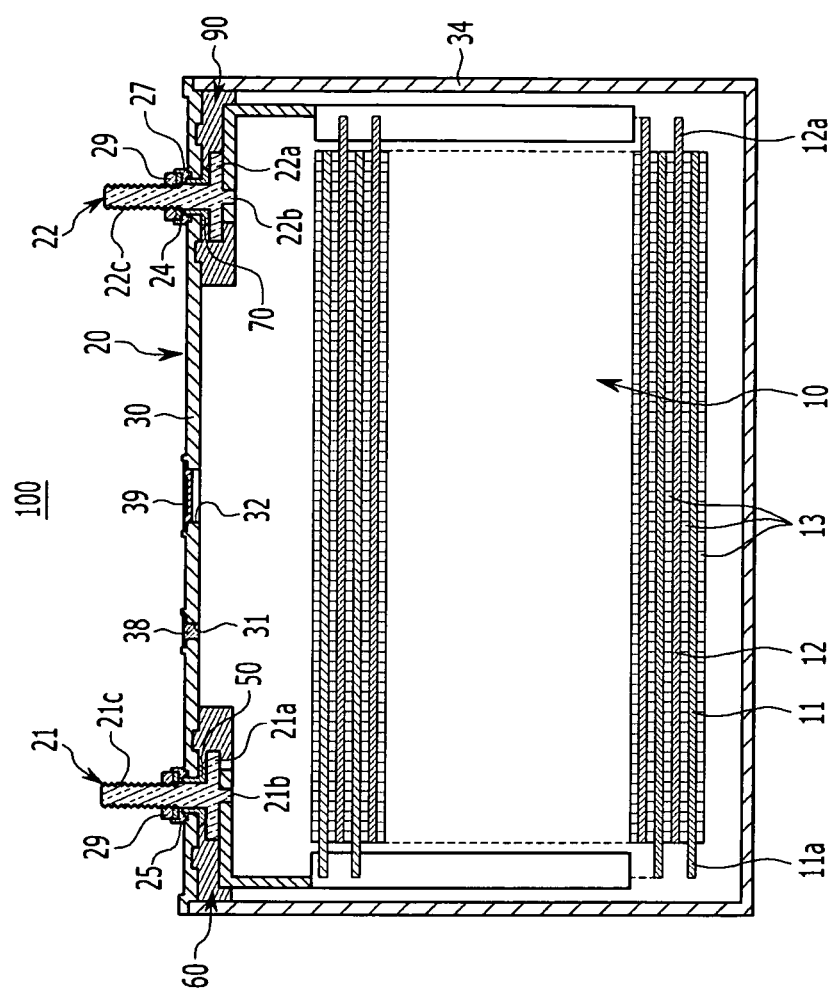
FIG. 2 illustrates a cross-sectional view of FIG. 1, taken along the line II-II.

FIG. 1 is a perspective view of a rechargeable battery according to an exemplary embodiment, and FIG. 2 is a cross-sectional view of FIG. 1, taken along the line II-II.

Referring to FIG. 1 and FIG. 2, a rechargeable battery 100 according to the present exemplary embodiment includes an electrode assembly 10 having a plurality of electrode components. The electrode assembly 10 being formed by spirally winding a first electrode 11 and a second electrode 12 with a separator 13 interposed therebetween, a case 34, a cap plate 30 in which an emission hole 32 is formed, a vent plate 39 combined to one end of the emission hole 32, and lower insulating members 60 and 90 provided in the case 34.

The rechargeable battery 100 according to the present exemplary embodiment is exemplarily described as a lithium ion rechargeable battery with a quadrangular shape. However, without being limited thereto, the present description may be applicable to various types of batteries such as a lithium polymer battery, a cylindrical battery, and the like. Herein, the first electrode 11 may be a negative electrode and the second electrode 12 may be a positive electrode, or the first electrode 11 may be a positive electrode and the second electrode 12 may be a negative electrode. However, the first electrode 11 and the second electrode 12 will be described without further characterization for better comprehension and ease of description.

The electrode assembly 10 may be formed in a jelly roll shape by spirally winding the first electrode 11, the second electrode 12, and the separator 13. The first electrode 11 and the second electrode 12 respectively may include a current collector formed with a thin metal foil and an active material coated on the surface of the current collector. In addition, the first electrode 11 and the second electrode 12 may be divided in to coated regions where the active material is coated over the current collector and uncoated regions 11a 12a where the active material is not coated over the current collector. The coated regions form most of the first and second electrodes 11 and 12 in the electrode assembly 10, and the uncoated regions 11a and 12a are disposed at respective sides of the coated region.

However, the present invention is not limited thereto, and the electrode assembly 10 may have a structure that the first and second electrodes formed with a plurality of sheets are stacked, interposing a separator therebetween.

The case 34 may be substantially formed in the shape of a cuboid, and has an opening at one side thereof. The cap assembly 20 includes a cap plate 30 covering the opening of the case 34, a first electrode terminal 21 protruding to the outside of the cap plate 30 and electrically connected with the first electrode 11, a second electrode terminal 22 protruding to the outside of the cap plate 30 and electrically connected with the second electrode 12, and a vent plate 39 having a notch 39a to be broken depending on a predetermined internal pressure level.

The cap plate 30 may be formed as a thin plate, and may be combined to the opening of the case 34 to seal the opening. The cap plate 30 blocks the inside of the sealed case 34 from the outside thereof. In addition, the inside and the outside of the cap plate 30 may be connected with each other, for example, by an electrolyte solution inlet 31 for injection of an electrolyte solution into the sealed case 34. After injection of the electrolyte solution, the electrolyte solution inlet 31 is sealed by a sealing cap 38.

The terminals 21 and 22 penetrate the cap plate 30. Upper gaskets 25 and 27 disposed in an upper portion of the cap plate 30 and lower gaskets 50 and 70 disposed in a lower portion of the cap plate 30 insulate the cap plate 30 from the terminals 21 and 22. In the present exemplary embodiment, the terminals 21 and 22 may include the first electrode terminal 21 and the second electrode terminal 22.

The terminals 21 and 22 may be formed in the shape of a circular cylinder. Nuts 29 may be provided at upper portions of the terminals 21 and 22 to support the terminals 21 and 22 therefrom. Screw threads may be formed at the outer circumferences of the terminals 21 and 22 so as to be engaged with the nuts 29. The terminals 21 and 22 may include rods 21c and 22c, terminal flanges 21a and 22a supporting the terminals from lower portions of the terminals 21 and 22 formed at the lower portions of the terminals 21 and 22, and combining protrusions 21b and 22b formed in lower ends of the flanges 21a and 22a. When the nuts 29 are fastened to the terminals 21 and 22, the terminal flanges 21a and 22a and the nuts 29 may press the upper gaskets 25 and 27 and the lower gaskets 50 and 70 such that terminals 21 and 22 and the cap plate 30 are sealed to each other. A washer 24 may be disposed under the nut 29 for buffering a fastening force.

However, the terminals 21 and 22 may be formed in the shape of a plate type terminal (not shown) combined with the terminal plate through a rivet.

The lower insulating members 60 and 90 are disposed adjacent to the cap plate 30 in the case 34. The lower insulating members 60 and 90 are assembled such that the electrode terminals 21 and 22 penetrate therethrough.

Figure 3:
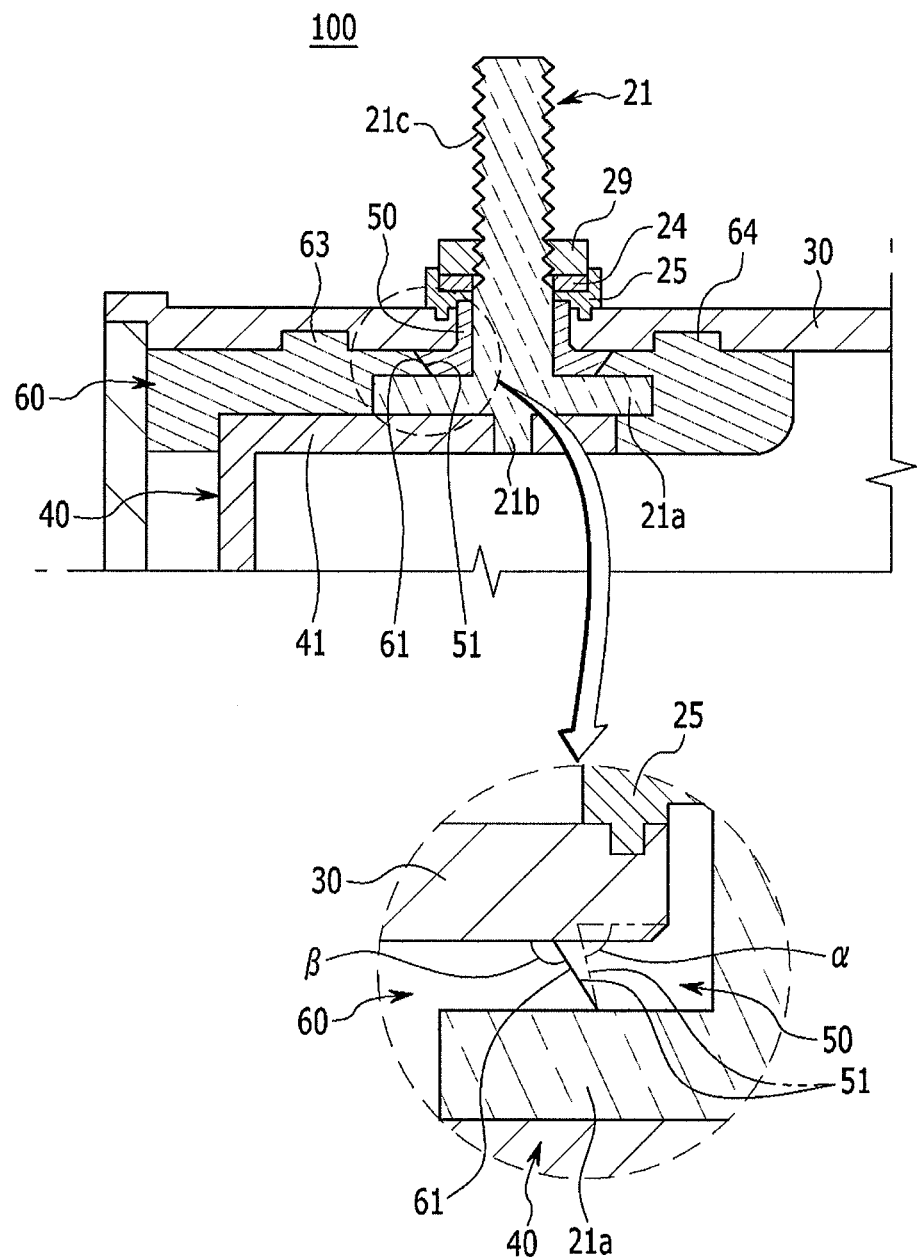
FIG. 3 illustrates a partial cross-sectional view of the rechargeable battery according to the exemplary embodiment of FIGS. 1-4.
Figure 4:
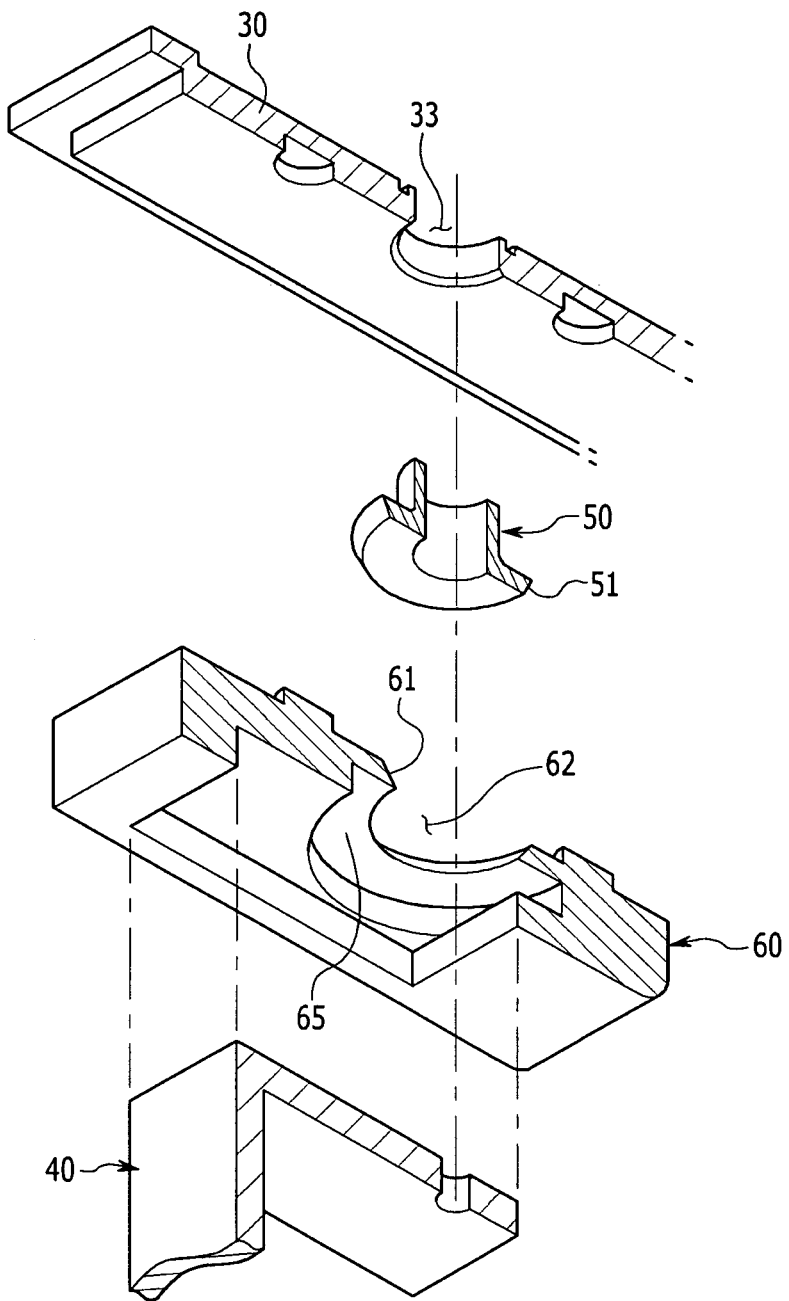
FIG. 4 illustrates a partially cutaway perspective view of the rechargeable battery according to the exemplary embodiment of FIGS. 1-4.

FIG. 3 illustrates a partial cross-sectional view of the rechargeable battery according to the present exemplary embodiment and FIG. 4 illustrates a partially cutaway perspective view of the rechargeable battery according to the present exemplary embodiment.

Referring to FIG. 3 and FIG. 4, the lower gasket 50 and the lower insulating member 60 provided in the rechargeable battery 100 according to the present exemplary embodiment will now be described in further detail.

In the rechargeable battery 100 according to the present exemplary embodiment, the lower gasket 50 insulating the first electrode terminal 21 and the lower gasket 70 insulating the second electrode terminal 22 may be symmetrically similar to each other. Therefore, a description of the lower gasket 70 will be omitted. In addition, the lower insulating member 60 combined to the first electrode terminal 21 and a lower insulating member 90 combined to the second electrode terminal 22 may be symmetrically similar to each other. Therefore, a description of the lower insulating member 90 will be omitted.

As shown in FIG. 3 and FIG. 4, the lower gasket 50 is provided between the rod 21c of the first electrode terminal 21 and an inner surface of the terminal hole 33 of the cap plate 30 to seal therebetween. In addition, the lower gasket 50 further extends to between the flange 21a and the cap plate 30 from between the rod 21c and the terminal hole 33 of the cap plate 30 to seal between the flange 21a and the cap plate 30.

In this case, a first inclined side 51 is formed at an end portion of the lower gasket 50 that extends between the flange 21a and the cap plate 30. An inclined angle $\alpha$ of the first inclined side 51 forms an acute angle with respect to a side of the cap plate 30 that contacts the lower gasket 50.

Accordingly, the lower gasket 50 may prevent an electrolyte solution in the case where the electrode assembly 10 is located from being leaked through the terminal hole 33.

In addition, a first fixing protrusion 63 and a second fixing protrusion 64 formed in an upper portion of the lower insulating member 60 are combined to a lower portion of the cap plate 30 such that the lower insulating member 60 is closely combined to the cap plate 30. A first electrode current collecting member 40 is combined to a lower portion of the lower insulating member 60. Thus, the lower insulating member 60 blocks a current from flowing between the cap plate 30 and the electrode assembly 10.

Further, referring to FIGS. 3 and 4, a through-hole 62 is formed in a portion of the lower insulating member 60, corresponding to the terminal hole 33, and a combining groove 65 is formed at the periphery of the through-hole 62 in a direction facing the first electrode current collecting member 40. The rod 21c of the first electrode terminal 21 penetrates the through-hole 62, and the flange 21a is fixed into the combining groove 65. A diameter of the combining groove 65 formed in the lower insulating member 60 is greater than the diameter of the through-hole 62. Thus, as shown in FIG. 4, a part of the lower insulating member 60 is disposed between the flange 21a and the cap plate 30 so that the flange 21a and the cap plate 30 may be sealed. The lower insulating member 60 may prevent electrolyte solution in the case from leaking through the flange 21a and the lower insulating member 60 so that corrosion of the cap plate 30 may be prevented.

An interior circumference of the through-hole 62 includes a second inclined side 61 that forms an obtuse inclined angle $\beta$ with respect to a side of the cap plate 30 that contacts the lower insulating member 60. The first inclined side 51 and the second inclined side 61 may have different inclined angles with respect the cap plate 30.

Thus, with reference to the side of the cap plate 30, the inclined angle $\alpha$ of the first inclined side 51 forms an acute angle and the inclined angle $\beta$ of the second inclined side 61 forms an obtuse angle. Therefore, the first inclined side 51 and the second inclined side 61 may be disposed to face each other.

In addition, in FIG. 3, when a lower end of the first inclined side 51 and a lower end of the second inclined side 61 initially contact each other on the flange 21a, a space may be formed between the first inclined side 51 and the second inclined side 61. The space between the first and second inclined sides 51 and 61 may then be filled by deformation of the first inclined side 51 when the lower gasket 50 is installed in the cap plate 30 so that the lower gasket 50 and the lower insulating member 60 can be further firmly sealed. The end portion of the lower gasket may include a deformable material such that the first inclined side 51 may be pressed against the second inclined side 61.

The first and second inclined sides 51 and 61 according to the present exemplary embodiment may be sealed to each other even when the first inclined side 51 is not deformed. With reference to the cap plate 30, the sum of the inclined angles $\alpha$ and $\beta$ of the first and second inclined sides 51 and 61 may be 180°, that is, the inclined angles $\alpha$ and $\beta$ may be supplementary angles. The first and second inclined sides 51 and 61 may be fully sealed to each other by contacting the first and second inclined sides 51 and 61 to each other.

In addition, in FIG. 3, the lower ends of the first inclined side 51 and the second inclined side 61 may face each other with a predetermined gap therebetween rather than contacting each other, so that a space may be formed therebetween.

As described above, when the first inclined side 51 of the lower gasket 50 is formed to provide an acute angle with the cap plate 30 and the second inclined side 61 of the lower insulating member 60 is formed to provide an obtuse angle with the cap plate 30, the length of a path that the electrolyte solution would have to travel between the first and second inclined sides 51 and 61 of the lower gasket 50 and the lower insulating member 60 in order to leak out is increased. In addition, a contact area between the inclined sides is increased such that a combining force between the first inclined side 51 and the second inclined side 61 is increased. Thus, leaking of the electrolyte solution between the cap plate 30 and the first electrode terminal 21 can be minimized or prevented.

Figure 5:
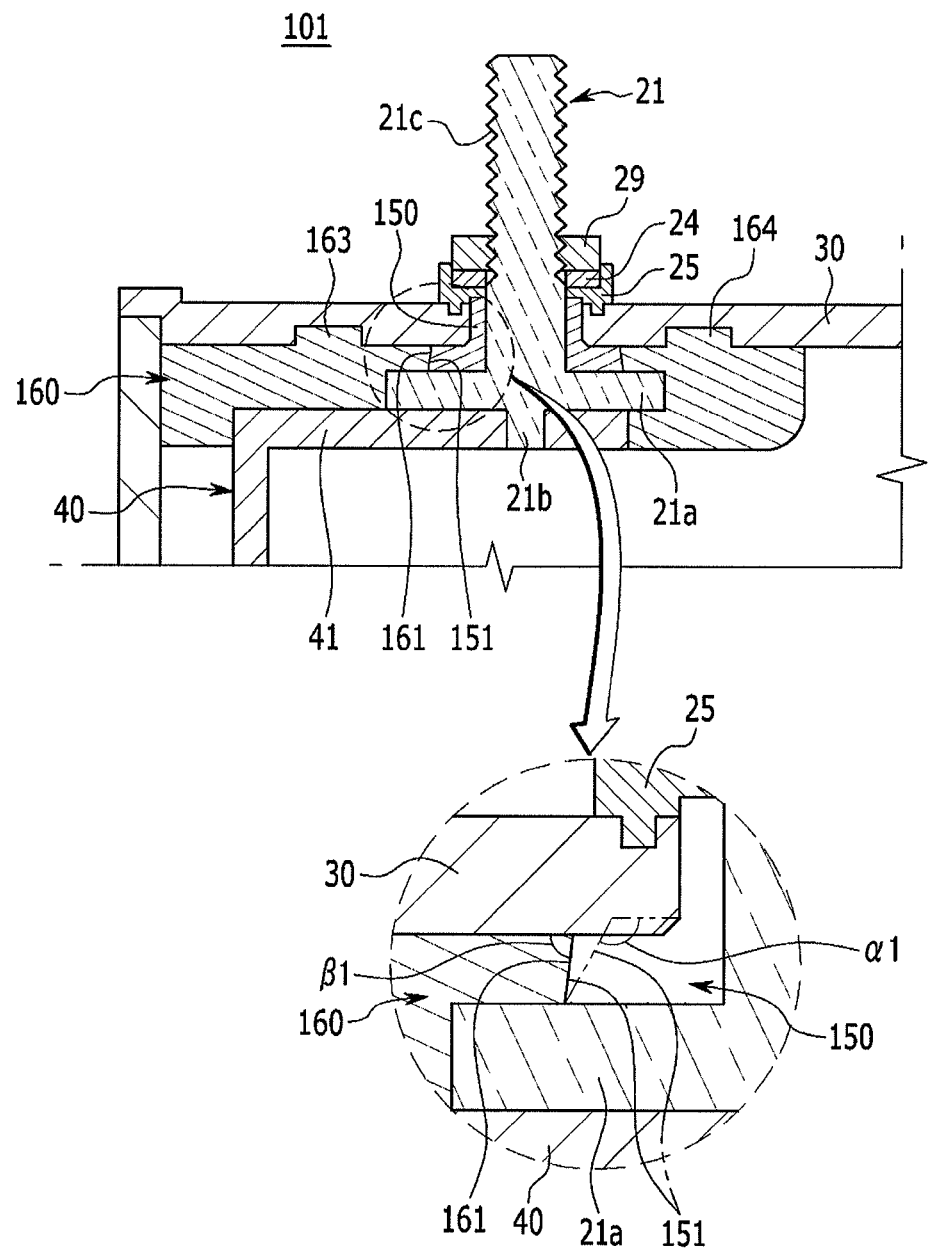
FIG. 5 illustrates a partial cross-sectional view of a rechargeable battery according to another exemplary embodiment.
Figure 6:
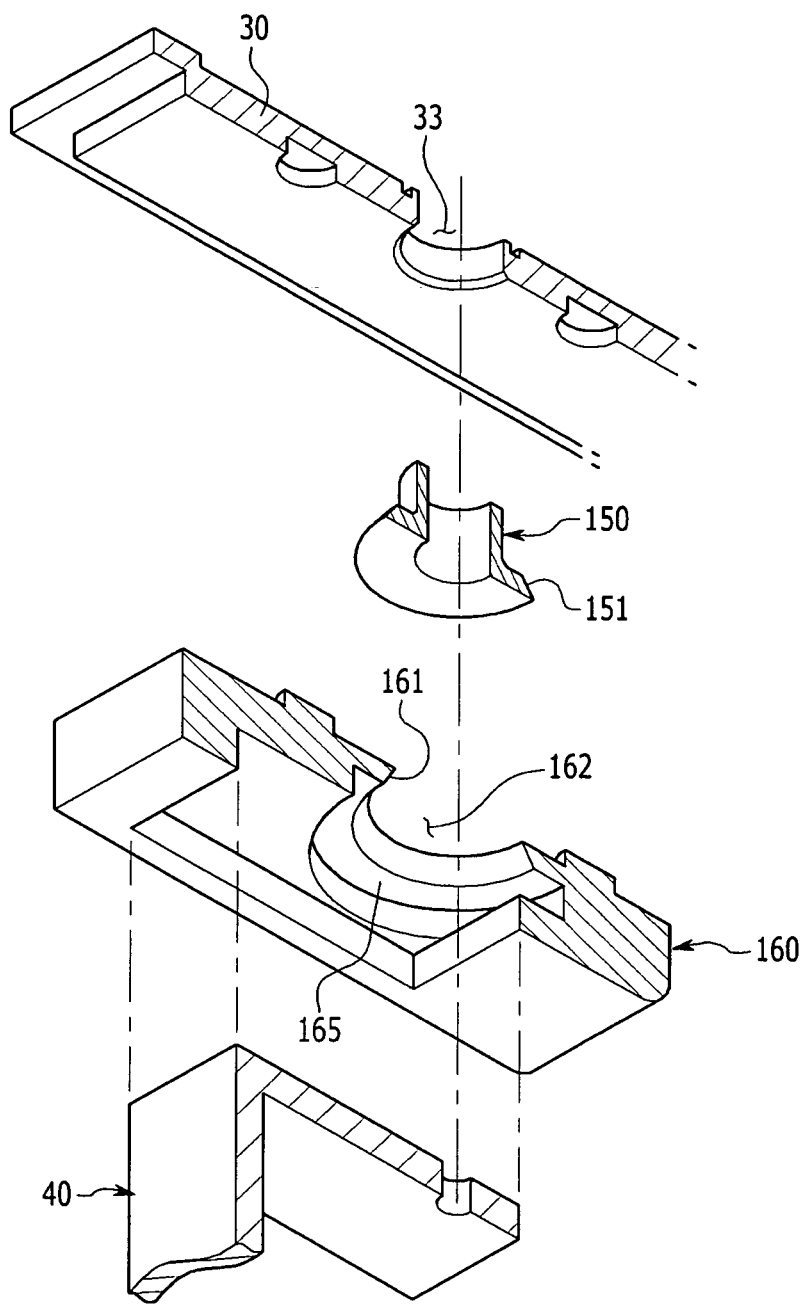
FIG. 6 illustrates a partially cutaway perspective view of the rechargeable battery according to the exemplary embodiment of FIG. 5.

FIG. 5 is a partial cross-sectional view of a rechargeable battery 101 according to another exemplary embodiment and FIG. 6 is a partially cutaway perspective view of the rechargeable battery 101 according to the exemplary embodiment of FIG. 5.

Referring to FIG. 5 and FIG. 6, the rechargeable battery 101 according to the present exemplary embodiment may be the same as the rechargeable battery 100 of the previous exemplary embodiment, except that a first inclined side 151 formed in a lower gasket 150 and a second inclined side 161 formed in a lower insulating member 160 may differ from the first inclined side 51 formed in the lower gasket 50 and the second inclined side 61 formed in the lower insulating member 60 according to the previously described exemplary embodiment. A description of features that are the same in both embodiments will not be repeated.

As shown in FIG. 5 and FIG. 6, the first inclined side 151 is formed at an end portion of a lower gasket 150 that extends between a flange 21a and a cap plate 30 from a lower portion of the cap plate 30. An inclined angle $\alpha 1$ of the first inclined side 151 forms an obtuse angle with reference to the cap plate 30.

In addition, a through-hole 162 is formed in a portion of the lower insulating member 160, corresponding to a terminal hole 33, and a combining groove 65 is formed at the periphery of the through-hole 162 in a direction facing a first electrode current collecting member 40. A diameter of the combining groove 165 formed in the lower insulating member 160 is greater than the diameter of the through-hole 162. An interior circumference of the through-hole 162 includes the second inclined side 161 that forms an acute angle with reference to the cap plate 30. The inclined angle $\alpha 1$ of the first inclined side 151 and an inclined angle $\beta 1$ of the second inclined side 161 are different from each other.

Thus, the inclined angle $\alpha 1$ of the first inclined side 151 forms an obtuse angle and the inclined angle $\alpha 1$ of the second inclined side 161 forms an acute angle with reference to the cap plate 30 such that the first inclined side 151 and the second inclined side 161 are disposed to face each other.

In FIG. 6, when a lower end of the first inclined side 151 and a lower end of the second inclined side 161 initially contact each other on the flange 21a, a space may be formed between the first inclined side 151 and the second inclined side 161. The space formed between the first inclined side 151 and the second inclined side 161 may then be filled by deformation of the first inclined side 151 when the lower gasket 150 is installed in the cap plate 30, Thereby, the lower gasket 150 and the lower insulating member 160 may be further firmly sealed. The end portion of the lower gasket may include a deformable or resilient material such that the first inclined side 151 may be pressed against the second inclined side 161.

However, the first and second inclined sides 151 and 161 according to the present exemplary embodiment may be sealed to each other even when the first inclined side 151 is not deformed. The sum of the inclined angles α1 and α1 of the first and second inclined sides 151 and 161 may be 180° with reference to the cap plate 30. In other words, the inclined angles α1 and β1 may be supplementary angles. In such case, the first and second inclined sides 151 and 161 may be fully sealed to each other by contacting the first and second inclined sides 151 and 161 to each other.

In addition, in FIG. 5, when a lower end of the first inclined side 151 and a lower end of the second inclined side 161 do not contact each other, they may face each other with a predetermined gap therebetween, such that a space may be formed therebetween.

Figure 7:
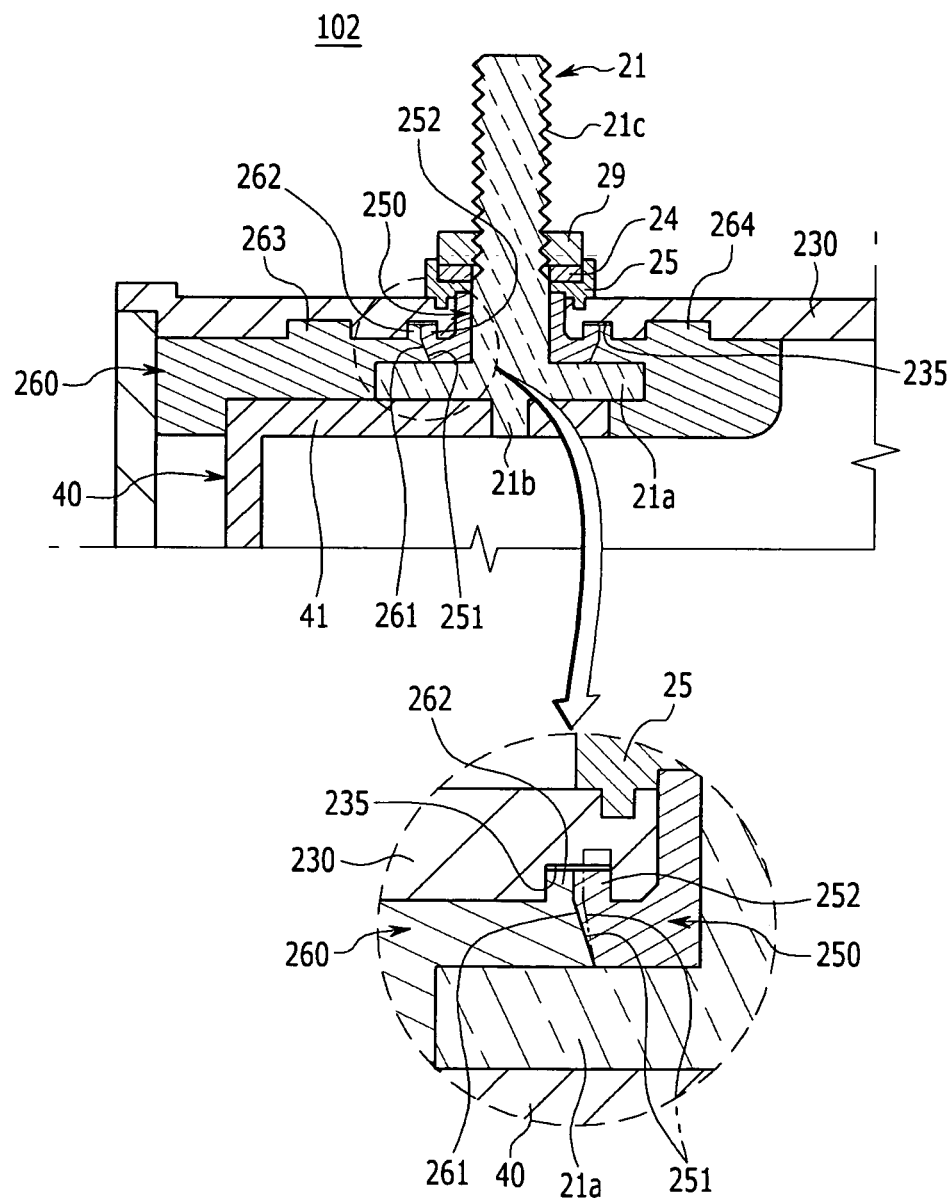
FIG. 7 illustrates a partial cross-sectional view of a rechargeable battery according to yet another exemplary embodiment.
Figure 8:
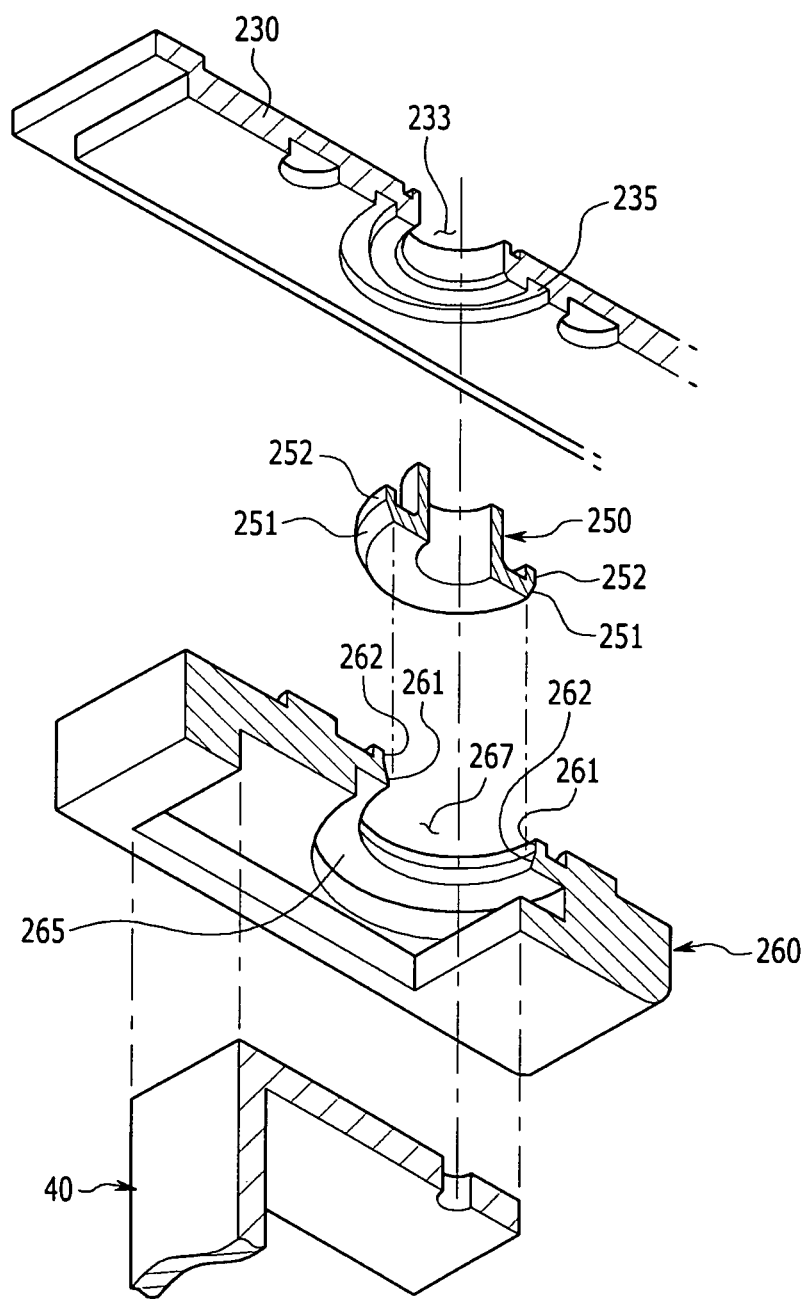
FIG. 8 illustrates a partially cutaway perspective view of the rechargeable battery according to the exemplary embodiment of FIG. 7.

FIG. 7 is a partial cross-sectional view of a rechargeable battery according to another exemplary embodiment and FIG. 8 is a partially cutaway perspective view of the rechargeable battery according to the exemplary embodiment.

Referring to FIG. 7 and FIG. 8, a rechargeable battery 102 according to the present exemplary embodiment may be the same as the rechargeable battery 100 of the exemplary embodiment of FIGS. 1-4 or the exemplary embodiment of FIGS. 5-6, except that the present exemplary embodiment further includes a first protruding portion 252 protruding from an end portion of a lower gasket 250, a second protruding portion 262 protruding from an end portion of a lower insulating member 260, and a stepped groove 235 formed in a cap plate 230. A description of features that are the same with respect to previously described embodiments will not be repeated.

For example, a first inclined side 251 formed at an end portion of a lower gasket 250 extended to between a flange 21a and a cap plate 30 at a lower portion of the cap plate 30 and a second inclined side 261 formed in an interior circumference of a through-hole 267 may have the same structure as the first inclined side 51 and the second inclined side 61 of the exemplary embodiment shown of FIG. 1-4 or the same structure as the first inclined side 151 and the second inclined side 161 of the exemplary embodiment of FIGS. 5 and 6. A description of these features will not be repeated.

As shown in FIG. 7 and FIG. 8, a stepped groove 235 is formed at the periphery of the terminal hole 233 at a lower end of the cap plate 230. The first protruding portion 252 protrudes from the first inclined side 251 disposed in the end portion of the lower gasket 250 in a direction facing the stepped groove 235. The first protruding portion 252 extends into or engages the stepped groove 234 when the cap plate 30 is installed.

In addition, the second protruding portion 262 protrudes from the second inclined side 261 disposed at a lower end of the lower insulating member 260 in a direction facing the stepped groove 235. The second protruding portion 262 extends into or engages the stepped groove 235 when the cap plate 30 is installed.

The first and second protruding portions 252 and 262 may be inserted into the stepped groove 235 and face each other as shown in FIG. 7.

As described in the exemplary embodiment of FIGS. 1-4, the first inclined side 251 may form an acute angle and the second inclined side 261 may form an obtuse angle with respect to a side of the cap plate 30, and the lower gasket 250 and the lower insulating member 260 may contact each other. A space may be initially formed between the first protruding portion 252 and the second protruding portion 262. When the lower gasket 250 is installed in the cap plate 30, the space between the lower gasket and the lower insulating member 26o may be filled by deformation of the first inclined side 251 and the first protruding portion 252 so that the lower gasket 250 and the lower insulating member 260 can be firmly sealed to each other. The first inclined side 251 and the first protruding portion 252 may include a deformable or resilient material such that the first inclined side 251 and first protruding portion 252 may be pressed against the second inclined side 261 and the second protruding portion 262.

However, the first protruding portion 252 and the second protruding portion 262 may be structured such that the first protruding portion 252 and the second protruding portion 262 may be sealed to each other even through the first inclined side 251 is not deformed.

In addition, the first protruding portion 252 and the second protruding portion 261 may face each other with a predetermined gap therebetween when the first inclined side 251 and the second inclined side 261 do not contact at their lower end portions so that a space may be formed between the first and second inclined sides 251 and 261 even though the lower gasket 250 is formed. In this case, a space may be formed between the first and second protruding portions 252 and 262.

Thus, compared to the exemplary embodiment of FIGS. 1-4, the length of a path for an electrolyte solution between the stepped groove 235, the first and second protruding portions 252 and 262 inserted into the stepped groove 235, and the first and second inclined sides 251 and 261 is increased. In addition, a contact area of the lower gasket 250 and the lower insulating member 260 is increased such that a combining force is also increased.

Thus, leaking of the electrolyte solution between the cap plate 30 and the first electrode terminal 21 can be further effectively minimized or prevented.

As described above, both of the first and second protruding portions 252 and 262 may formed in the lower gasket 250 and the lower insulating member 260 according to the present exemplary embodiment. However, it is also possible to provide only the first protruding member 252 in the lower gasket 250, the first protruding member 252 being structured to extend into the stepped groove 235 by itself. It is also possible to provide only the second protruding member 262, the second protruding member 262 being structured to extend into the stepped groove 235 by itself.

In addition, instead of inclined sides that are formed at the end portion of the lower gasket 250 disposed in the lower portion of the cap plate 230 and the end portion of the lower insulating member 260, sides of the end portion of the lower gasket 250 or the end portion of the lower insulating member 260 may be perpendicular to a side of the cap plate 230 that contacts the lower gasket 250 or the lower insulating member 260.

By way of summary and review, due to iterative charging and discharging of a rechargeable battery or due to an external impact, there is a risk that an electrolyte solution may leak out of the rechargeable battery from the electrode assembly. The leaked electrolyte solution may prevented from flowing between a cap plate and an electrode terminal by a lower gasket and a lower insulating member. The embodiments disclosed herein may lessen any risk that the electrolyte solution may partially flow between the lower gasket and the lower insulating member. The embodiments may also lessen any risk that a current may flow between the cap plate and the electrode terminal due to the leaking of the electrolyte solution, thereby causing corrosion of the cap plate.

The described technology provides a rechargeable battery having a lower gasket and a lower insulating member in a structure that can prevent inflow or leaking of an electrolyte solution in the case between a cap plate and a terminal. According to the exemplary embodiments, the electrolyte solution in the case can be effectively prevented from flowing between the cap plate and the electrode terminal.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope as set forth in the following claims.

What is claimed is:

1. A rechargeable battery comprising:
   an electrode assembly;
   a case having an opening and in which the electrode assembly is installed;
   a cap plate combined to the opening and sealing the case;
   at least one electrode terminal electrically connected with the electrode assembly;
   a lower gasket between the cap plate and the electrode terminal, the lower gasket having an end portion at a lower portion of the cap plate and including a first inclined side forming an acute angle or an obtuse angle with respect to a side of the cap plate; and
   a lower insulating member provided in the case, the lower insulating member having an end portion adjacent to the end portion of the lower gasket in a lower portion of the cap plate and including a second inclined side forming an acute angle or an obtuse angle with respect to the side of the cap plate,
   wherein the cap plate includes a stepped groove at a lower portion thereof and at least one of the end portion of the lower gasket and the end portion of the lower insulating member extends into the stepped groove, and
   wherein:
   the lower gasket includes a first protruding portion protruding from the end portion of the lower gasket,
   the lower insulating member includes a second protruding portion protruding from the end portion of the lower insulating member, and
   the first and second protruding portions extend into the stepped groove.

2. The rechargeable battery as claimed in claim 1, wherein the first inclined side of the lower gasket and the second inclined side of the lower insulating member have different inclined angles.

3. The rechargeable battery as claimed in claim 2, wherein the inclined angle of the first inclined side is smaller than the inclined angle of the second inclined side.

4. The rechargeable battery as claimed in claim 2, wherein the inclined angle of the first inclined side is greater than the inclined angle of the second inclined side.

5. The rechargeable battery as claimed in claim 2, wherein the inclined angle of the first inclined side and the inclined angle of the second inclined side are supplementary angles.

6. The rechargeable battery as claimed in claim 1, wherein the first inclined side of the lower gasket and the second inclined side of the lower insulating member at least partially contact each other.

7. The rechargeable battery as claimed in claim 6, wherein the first inclined side and the second inclined side fully contact each other.

8. The rechargeable battery as claimed in claim 1, wherein the end portion of the lower gasket includes a deformable material and wherein the first inclined side presses against the second inclined side to seal a space between the first inclined side and the second inclined side.

9. The rechargeable battery as claimed in claim 1, wherein:
   the end portion of the lower gasket includes a first inclined side,
   the end portion of the lower insulating member includes a second inclined side, and
   the first inclined side of the lower gasket and the second inclined side of the lower insulating member contact each other.

10. The rechargeable battery as claimed in claim 9, wherein the end portion of the lower gasket includes a deformable material such that the first inclined side presses against the second inclined side to seal a space between the first inclined side and the second inclined side.

* * * * *